US012460281B2

(12) United States Patent
Nishino

(10) Patent No.: US 12,460,281 B2
(45) Date of Patent: Nov. 4, 2025

(54) TUNGSTEN-CONTAINING MATERIAL AND DIRECT CURRENT DISCHARGE LAMP ELECTRODE

(71) Applicant: A.L.M.T. Corp., Tokyo (JP)

(72) Inventor: Hidenobu Nishino, Toyama (JP)

(73) Assignee: A.L.M.T. Corp., Tokyo (JP)

( * ) Notice: Subject to any disclaimer, the term of this patent is extended or adjusted under 35 U.S.C. 154(b) by 0 days.

(21) Appl. No.: 18/854,332

(22) PCT Filed: Apr. 11, 2023

(86) PCT No.: PCT/JP2023/014759
§ 371 (c)(1),
(2) Date: Oct. 4, 2024

(87) PCT Pub. No.: WO2023/199921
PCT Pub. Date: Oct. 19, 2023

(65) Prior Publication Data
US 2025/0223674 A1 Jul. 10, 2025

(30) Foreign Application Priority Data
Apr. 15, 2022 (JP) ................................ 2022-067481

(51) Int. Cl.

| | |
|---|---|
| ***C22C 27/04*** | (2006.01) |
| ***H01J 61/06*** | (2006.01) |
| ***H01J 61/073*** | (2006.01) |

(52) U.S. Cl.
CPC .............. *C22C 27/04* (2013.01); *H01J 61/06* (2013.01); *H01J 61/0732* (2013.01); *H01J 61/0735* (2013.01)

(58) Field of Classification Search
CPC ............................................ H01J 61/06–0737
See application file for complete search history.

(56) References Cited

U.S. PATENT DOCUMENTS

2007/0148031 A1 6/2007 Spielmann et al.

FOREIGN PATENT DOCUMENTS

| | | | | | |
|---|---|---|---|---|---|
| CN | 1761026 | A | * | 4/2006 | H01J 61/86 |
| CN | 1942999 | A | * | 4/2007 | H01J 61/0735 |
| JP | H05290802 | A | * | 11/1993 | |
| JP | 2001-226735 | A | | 8/2001 | |
| JP | 2003-027111 | A | | 1/2003 | |
| JP | 2005-183355 | A | | 7/2005 | |
| JP | 2007-115615 | A | | 5/2007 | |
| JP | 2007-169789 | A | | 7/2007 | |
| KR | 20050061293 | A | * | 6/2005 | H01J 61/86 |
| WO | WO-2009109566 | A1 | * | 9/2009 | H01J 61/0735 |

* cited by examiner

*Primary Examiner* — Mariceli Santiago
(74) *Attorney, Agent, or Firm* — Renner, Otto, Boisselle & Sklar, LLP

(57) ABSTRACT

A tungsten-containing material that has an oxygen generation quantity of more than 1 ppm and 20 ppm or less at 2100° C. to 2300° C. as detected by oxygen analysis based on an oxygen separation method, and contains 5 ppm or more and 30 ppm or less of potassium.

5 Claims, 1 Drawing Sheet

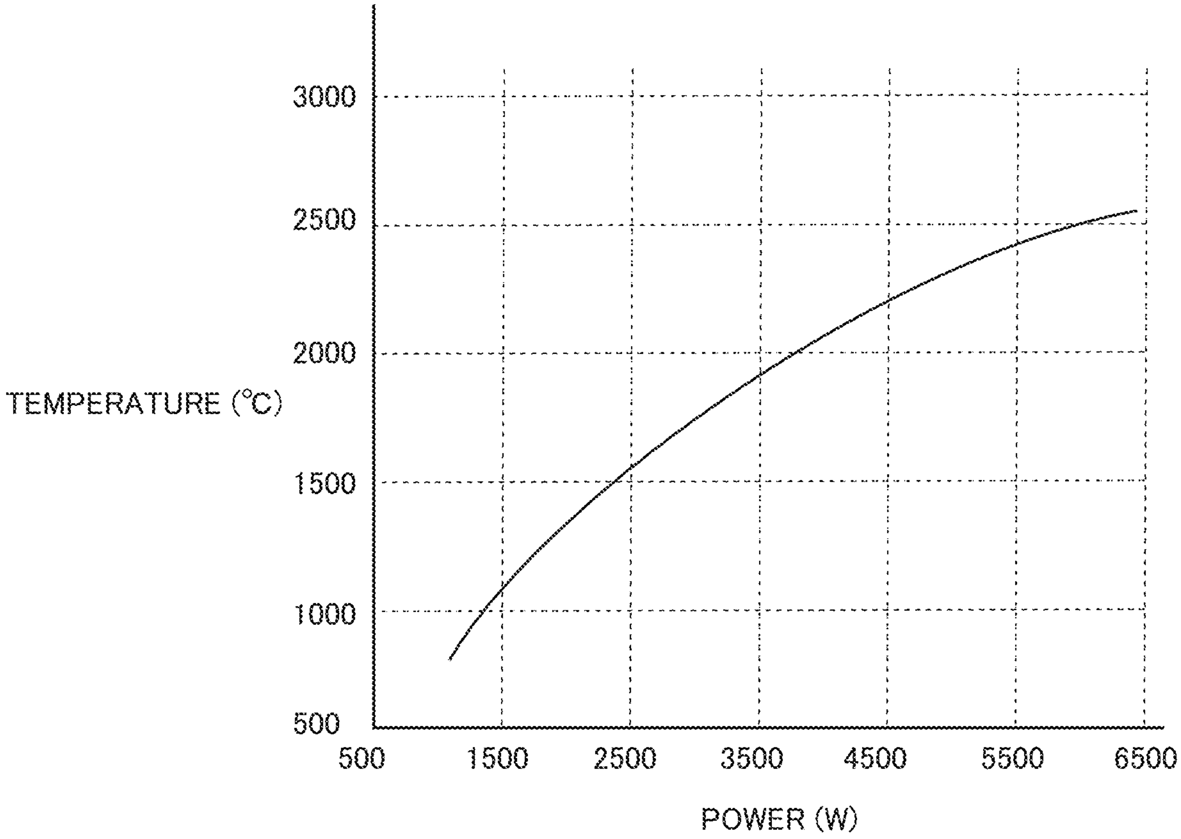
TEMPERATURE (℃)
3000
2500
2000
1500
1000
500
500
1500
2500
3500
4500
5500
6500
POWER (W)

TUNGSTEN-CONTAINING MATERIAL AND DIRECT CURRENT DISCHARGE LAMP ELECTRODE

TECHNICAL FIELD

The present invention relates to a tungsten-containing material. The present application claims priority based on Japanese Patent Application No. 2022-067481 filed on Apr. 15, 2022. The entire contents of this Japanese patent application are hereby incorporated by reference.

BACKGROUND ART

To date, a tungsten-containing material has been disclosed in, for example, Japanese Patent Laying-Open No. 2003-027111 (PTL 1), Japanese Patent Laying-Open No. 2007-169789 (Japanese Patent No. 5265867) (PTL 2), and Japanese Patent Laying-Open No. 2005-183355 (Japanese Patent No. 4167199) (PTL 3).

CITATION LIST

Patent Literature

PTL 1: Japanese Patent Laying-Open No. 2003-027111
PTL 2: Japanese Patent Laying-Open No. 2007-169789
PTL 3: Japanese Patent Laying-Open No. 2005-183355

SUMMARY OF INVENTION

A tungsten-containing material has an oxygen generation quantity of more than 1 ppm and 20 ppm or less at 2100° C. to 2300° C. as detected by oxygen analysis based on an oxygen separation method, and contains 5 ppm or more and 30 ppm or less of potassium.

BRIEF DESCRIPTION OF DRAWINGS

FIG. 1 is a graph indicating a relation between power and a temperature in an oxygen separator used in an embodiment.

DESCRIPTION OF EMBODIMENTS

Problem to be Solved by the Present Disclosure

A conventional tungsten-containing material has had a problem of a low illuminance maintenance rate in the case of use as a discharge lamp electrode.

Embodiments of the present invention are described below with reference to the drawings.

(1) Contents of the Present Disclosure

Japanese Patent Laying-Open No. 2007-169789 (PTL 2) discloses a method of producing a component or a semifinished product from a material of a group including molybdenum, a molybdenum alloy, tungsten, and a tungsten alloy, the component or the semifinished product having an average relative density of more than 98.55%, a relative core density of more than 98.3%, and, transversely to a direction of deformation due to working, an average crystal grain number of more than 100 crystal grains/$mm^2$ in a deformed state due to the working, the method including the following steps.

Preparing a powder with a particle size according to Fisher of 0.5 to 10 μm. Pressing the powder under a pressure of 100 to 500 MPa.

Sintering at a temperature of (0.55 to 0.92)×solidus temperature so that 90%<relative density D<98.5%, and hot-isostatic pressing, without using a die, at a temperature of (0.40 to 0.65)×solidus temperature and under a pressure of 50 to 300 MPa.

Forming with a degree of forming φ so that 15%<φ<90%, by radial forging or rolling.

Japanese Patent Laying-Open No. 2003-027111 (PTL 1) discloses a method for manufacturing a refractory metal material, in which the refractory metal material is obtained by performing plastic working in a temperature range of 700° C. to 1700° C. on an ingot composed of at least one of Mo and W or composed of an alloy containing at least one of Mo and W so that its cross section becomes non-circular.

Japanese Patent Laying-Open No. 2005-183355 (PTL 3) discloses a tungsten electrode containing less than 5 ppm of Si, 5 to 20 ppm of K, and 5 to 20 ppm of Al while the remainder is substantially composed of tungsten, and having a diameter of 15 mm or more. In the disclosed tungsten for a discharge lamp, which has a density of 19100 kg/$m^3$ or more, the area of portions where the crystal grain aspect ratio is 2 to 20 occupies 50% or more.

A tungsten material is one of refractory materials (whose melting point is approximately 3400° C.), and is used as a high temperature furnace member, a filament, a discharge lamp, or the like, utilizing its advantages.

In particular, in the case of use in a discharge lamp, a load by a temperature higher than 2500° C. is expected to be applied, and in many cases tungsten to which potassium is added is employed for an electrode as a material that can withstand it.

The discharge lamp for which this potassium-doped tungsten is employed may suffer wear and scattering of an electrode tip due to electric discharge during use, and impurities may be scattered and adhere to the inner surface of the glass of the lamp, which is called blackening. Also, the deformation of the tip induces a flicker of the light source caused by the electric discharge, resulting in loss of stability needed for the light source, and in the case of use for exposure of an electronic component circuit, the life of the lamp is terminated.

Adding potassium to tungsten enhances re-crystallization properties of the tungsten material and hampers growth of crystal grains at an electrode tip at the time of lighting of a discharge lamp.

PTL 1 and PTL 2 as related art employ the techniques described above to enhance the characteristics of a discharge lamp, and have achieved lengthening of the lifetime of a lamp through, for example, micronization of re-crystallized grains during use of an electrode by controlling the quantity of K added to tungsten and improving the specific gravity.

In the present disclosure, a cause of decrease in illuminance maintenance rate involved by blackening of a lamp is found to be oxygen generated in a tungsten material in a specific temperature range, and deformation and wear/scattering of the tungsten are diminished by reducing the quantity of the oxygen.

A tungsten material is employed for a positive electrode of a direct current discharge lamp used for semiconductor exposure and illumination. The positive electrode receiving electrons and heated to a high temperature causes blackening on the inner side of the glass of the lamp and reduction in luminous flux as a result of the oxygen contained in the material reacting on the tungsten during the electric discharge of the lamp and becoming volatilized/scattered as a low melting point oxide, and lowers the quality as a point light source, which a power source for exposure is required to have, because of deformation while rendering the lifetime shortened.

When used as a lamp, a conventional tungsten material may cause blackening on the inner side of the glass of the lamp, which is a result of scattering of the tungsten and other impurities caused by an oxygen component, and become unable to be used with reliability.

In the present disclosure, new manufacturing conditions are adopted to provide a tungsten-containing material where the quantity of the oxygen contained in the material, and preferably the quantity of the potassium and the crystal grain size are controlled.

Thus, blackening of a discharge lamp is inhibited and the luminous flux is maintained for a long time, which can contribute to lengthening of the lifetime. The tungsten material of the present disclosure is also applicable to a furnace member used at a high temperature, such as in a nuclear fusion reactor, which dislikes release of oxygen and requires a material with a high strength, in addition to an electrode of a discharge lamp.

A tungsten-containing material of the present disclosure has an oxygen generation quantity of more than 1 ppm and 20 ppm or less at 2100° C. to 2300° C. as detected by oxygen analysis based on an oxygen separation method, and contains 5 ppm or more and 30 ppm or less of potassium.

(2) Measurement of Oxygen Release Quantity

If the quantity of the oxygen generated exceeds 20 ppm when a lamp is used, blackening of the glass of the lamp is caused, which leads to shortening of the lifetime of the lamp. More preferably, the quantity of the oxygen generated is 10 ppm or less.

A measurement method of the oxygen quantity is described below.

The weight of a measurement material is 0.10 g to 1.00 g and a material sampled from a central portion of the tungsten-containing material is used.

In the measurement, evaluation was conducted by regarding the quantity of the oxygen detected by an oxygen separator function in a designated temperature range (2100° C. to 2300° C.) as the oxygen release quantity at 2100° C. to 2300° C.

Analysis conditions and parameters are shown below.

[Conditions]

Oxygen·nitrogen·hydrogen analysis apparatus made by LECO Japan Corporation, type: ON836

Carrier gas: helium gas

Flux: nickel grains

Crucible: standard crucible

Analysis method: non-dispersive infrared absorption method

[Parameters]

Standardized sample: YY-001-114-00 (0.119%)

Analysis mode: automatic

Analysis delay: 45 seconds

Integration delay: 2 seconds

Comparator: not used

End line: 2 seconds

Integration time: 500 seconds

Analysis power: from 100 W to 6000 W for temperature raising taking 400 seconds

FIG. 1 is a graph indicating a relation between power and a temperature in an oxygen separator used in an embodiment. The test temperature is 2500° C. according to the correspondence indication in FIG. 1 on the power value and the temperature.

(3) Measurement Method of Composition, Average Crystal Grain Size, and Density The quantity of the potassium added to the tungsten material needs to be 5 ppm or more and 30 ppm or less. The potassium serves as a grain growth inhibiting material for an electrode. With less than 5 ppm, no grain growth inhibiting effect acts, and with more than 30 ppm, the lifetime of a discharge lamp is affected to be shortened. Because of the aforementioned potassium, the crystal grain size of the tungsten material at the time of re-crystallization is 200 μm or less. The measurement of the crystal grain size is performed on an RD surface (a surface orthogonal to the direction of rolling). Specifically, an enlarged photograph is taken in a given position close to the central portion at a magnification of 200, and a certain length (1000 μm) in its field of vision is set as the numerator. The number of crystal grain boundaries across the given length is set as the denominator. The crystal grain size in the field of vision is determined by the intercept method where the value of the numerator/denominator is the crystal grain size in the field of vision. The measurement is performed on a total of six fields of vision (per sample), and the average value of the crystal grain sizes is gained as the crystal grain size.

The measurement method of the potassium quantity is described below.

The mass of a measurement material is 0.40 g, and a material sampled from a central portion of the tungsten material is used.

As sample pretreatment prior to the measurement, 5-minute acid cleaning using acid ($HNO_3$:HF:water=1:1:1 (volume ratio)) is performed. After that, 15-minute water washing is performed. The sample dried after the 15-minute water washing is placed on a platinum plate, and 1 $cm^3$ of nitric acid and 1 $cm^3$ of hydrofluoric acid are added to be heated and decomposed. The resultant solution is evaporated and dried into a tungsten oxide. Subsequently, 10 vol. % of lithium carbonate is added and then the oxide is heated and dissolved, and the resultant solution is fixed at 50 $cm^3$ as a measurement sample solution.

For a measurement apparatus, a flame atomic absorption spectrophotometer made by Analytik Jena Japan Co., Ltd., type: ContrAA300, is employed. The composition is measured according to JISH1403: 2001 (a tungsten material analyzing method). The analyzing method is based on the atomic absorption spectrometry.

The tungsten-containing material can contain calcium, silicon, aluminum, and magnesium as well as potassium. The total content of the composite of these except tungsten is 30 ppm or more and 300 ppm or less. The measurement method of these is performed according to JISH1403: 2001 (the tungsten material analysis method).

The density of the tungsten-containing material is measured by a method in which the respective masses in the air and water are measured using Archimedes' principle and the volume is determined from both of the masses to calculate the density.

Preferably, the crystal grain size of the tungsten-containing material is 200 μm or less. When the crystal grain size is 200 μm or less, the illuminance maintenance rate in the case of use as a direct current discharge lamp is the highest.

Preferably, the density of the tungsten-containing material is 19.1 $g/cm^3$ or more.

Preferably, the tungsten-containing material is used in a discharge lamp electrode.

Preferably, the discharge lamp electrode is a direct current discharge lamp electrode.

Examples

A. Manufacture of Tungsten-Containing Material (Rod)

(A-1) Manufacturing Process of Tungsten Sintered Material

[Preparation of Raw Material]

Potassium-containing tungsten powder was obtained by adding potassium to a tungsten raw material by a method similar to a method for typical potassium-added tungsten for illumination and carrying out hydrogen reduction thereon. In the potassium-containing tungsten powder, the quantity of the potassium added was adjusted by performing acid cleaning in an intermediate step when necessary. The FSSS particle size of the potassium-containing tungsten powder according to Fisher was 2.2 to 2.4 μm.

[Heat Treatment]

Since oxygen still remained in this powder slightly, heat treatment was further conducted through retention at 700° C. in a hydrogen atmosphere for ten hours in a batch type electric furnace. After that, cooling to a room temperature was performed in hydrogen, and the low-oxygen and potassium-containing tungsten powder was obtained.

While the oxygen quantity of conventional tungsten powder is 600 to 900 ppm, the oxygen quantity of the low-oxygen and potassium-containing tungsten powder was 150 to 250 ppm because of this heat treatment.

[Press and Sintering]

A pressed material was made by keeping this powder so that the powder would not get exposed to oxygen in the air, and putting the powder into a rubber mold for hydrostatic press and performing pressurization at 180 MPa through the hydrostatic press. Further, this pressed material was molded and a molded material was made.

On this molded material, 10-hour primary sintering was performed in an argon atmosphere at 1500° C. using a hot isotropic pressurization (HIP) apparatus. On this primary sintered material, 30-hour sintering was performed in a hydrogen atmosphere at 2300° C. using a batch type sintering furnace, and a tungsten sintered material (a tungsten-containing material) was obtained.

As the size at this time, the sintered material had a diameter of 100 mm×a length of 500 mm. The density after the sintering was 18.3 g/cm$^3$.

The content of the silicon contained in the sintered material was less than 5 ppm.

As a result of various tests, the FSSS particle size is preferably 1 μm or more and 10 μm or less.

If the particle size exceeds 10 μm, the specific gravity of the sintered material could be lowered and the density could fail to become high enough to enable the sintered material to endure plastic working. The expression "could" implies that there is a slight possibility of causing such a consequence and does not mean a high possibility thereof.

If the particle size is less than 1 μm, the density in the press could not be raised and the specific gravity after the sintering could be lowered.

The sintering method is not limited as long as the density of the sintered material is 17.5 g/cm$^3$ or more, which is preferably 18.0 g/cm$^3$ or more.

Aside from a vacuum atmosphere, an inert atmosphere of argon or the like, or a hydrogen atmosphere can also be selected as the sintering atmosphere. As long as the density after the sintering becomes 17.5 g/cm$^3$ or more, as the sintering atmosphere, a combination of a plurality of atmospheres (e.g. a hydrogen atmosphere for up to 1200° C. and a vacuum atmosphere for 1200° C. to 2000° C.) is possible too, and the sintering temperature, the sintering duration, and the like can also be selected as desired. The heating is preferably performed at a sintering temperature of 2300° C. or more.

(A-2) Working Process

After heating this tungsten sintered material at 1800° C. in hydrogen in a heating furnace, forging using a die was performed in a forging machine. The forging was performed so that the diameter became 80 mm at the first working, 70 mm at the second working, 60 mm at the third working, and 50 mm at the fourth working. At this time, heat was applied per heating. The material forged to have a diameter of 50 mm was heated this time at a heating furnace temperature of 1800° C., and worked by swaging (rotary swaging) so that the diameter became between 40 mm and 15 mm. At this time, the working was performed while conducting sampling based on a given size.

The heating atmosphere in the forging may be an argon or hydrogen atmosphere aside from a nitrogen atmosphere.

The heating temperature in the forging is preferably 1600° C. or more and 1800° C. or less. If it exceeds 1800° C., the lifetime of the heating furnace is shortened, which results in unfavorable productivity.

The total working rate is preferably 65% or more. However, as to the working rate, the final specific gravity is just required to exceed 19.1 and if it is less than this, the specific gravity may not be satisfied. Also, it is more favorable that the specific gravity exceeds 19.1 and becomes closer to a theoretical specific gravity of tungsten.

Tungsten-containing materials (tungsten rods) as sample nos. 1 to 12 were made by the above-described processes.

TABLE 1

| SAMPLE NO. | OXYGEN RELEASE QUANTITY (ppm) AT 2100 TO 2300° C. | POTASSIUM (ppm) | AVERAGE CRYSTAL GRAIN SIZE (μm) | DENSITY (g/cm$^3$) | ILLUMINANCE MAINTENANCE RATE (%) | EVALUATION |
|---|---|---|---|---|---|---|
| 1 | 9 | 15 | 150 | 19.1 | 97.4 | A |
| 2 | 4 | 10 | 200 | 19.1 | 96.3 | A |
| 3 | 18 | 15 | 180 | 19.1 | 96.0 | A |
| 4 | 17 | 18 | 150 | 19.1 | 95.9 | A |
| 5 | 20 | 24 | 100 | 19.1 | 95.9 | A |
| 6 | 13 | 15 | 200 | 19.1 | 95.8 | A |
| 7 | 20 | 15 | 150 | 19.1 | 95.6 | A |
| 8 | 17 | 9 | 150 | 19.1 | 95.5 | A |
| 9 | 20 | 15 | 160 | 19.1 | 95.3 | A |
| 10 | 10 | 8 | 200 | 19.1 | 95.3 | A |
| 11 | 20 | 22 | 150 | 19.1 | 95.1 | A |

TABLE 1-continued

| SAMPLE NO. | OXYGEN RELEASE QUANTITY (ppm) AT 2100 TO 2300° C. | POTASSIUM (ppm) | AVERAGE CRYSTAL GRAIN SIZE (μm) | DENSITY (g/cm$^3$) | ILLUMINANCE MAINTENANCE RATE (%) | EVALUATION |
|---|---|---|---|---|---|---|
| 12 | 20 | 28 | 100 | 19.1 | 95.0 | A |
| 13 | 20 | 5 | 600 | 19.1 | 94.2 | B |
| 14 | 20 | 15 | 150 | 19.0 | 93.8 | B |
| 15 | 20 | 15 | 250 | 18.9 | 92.1 | C |
| 16 | 30 | 35 | 200 | 19.2 | 89.9 | D |
| 17 | ≤1 | <5 | 1230 | 19.1 | 85.0 | D |
| 18 | 55 | 30 | 250 | 19.1 | 88.3 | D |

THE REMAINDER IS COMPOSED OF TUNGSTEN

Sample no. 13 is a sample made by the manufacturing method described above in (A-1) and (A-2) and having a smaller content of potassium. In this case, the crystal grain size is larger, and sample no. 14 is a sample made by the manufacturing method described above in (A-1) and (A-2) and being lower in specific gravity. Sample no. 15 is a sample made by the manufacturing method described above in (A-1) and (A-2) and being lower in specific gravity, where grains are a little larger. Sample no. 16 is a sample made by the manufacturing method described above in (A-1) (in which, however, [Heat treatment] is not performed) and (A-2) and containing potassium. Sample no. 17 is a sample made by the manufacturing method described above in (A-1) (in which, however, [Heat treatment] is not performed) and (A-2) and containing no potassium. Sample no. 18 is a sample made by the manufacturing method described above in (A-1) (in which, however, [Heat treatment] is not performed) and (A-2) and having a higher potassium content.

B. Results of Evaluation

In measuring the lifetime of a discharge lamp, a direct current discharge lamp of 1 kW was made and evaluated according to its illuminance maintenance rate. In the discharge lamp, for its positive electrode, the tungsten materials of sample nos. 1 to 15 manufactured in the process of "A. Manufacture of tungsten rod" were worked into 30-mm electrodes and used. For its negative electrode, tungsten containing 1 mass % of thorium was used. In a high-power discharge lamp, the tungsten electrode of the present disclosure apparently exhibited its lifetime lengthening effect. Table 1 indicates the release oxygen quantity, the content of potassium, the average crystal grain size, the density, and the illuminance maintenance rate (the lamp lifetime) as well as the results on the lamp lifetime. The method of measuring these followed "(2) Measurement of oxygen release quantity" and "(3) Measurement method of composition, average crystal grain size, and density".

When the tungsten material has the above-described features, similar effects can be obtained, no matter how many millimeters its diameter is. The manufacture conditions are not limited, either, and for the sintering, high-temperature press (HIP, HP) may be employed and the plastic working method is not limited to forging, rolling, extruding, or the like as well.

The tungsten material can bring similar effects not only in a simple shape but also when it has a hole made by machining or undergoes grooving for example.

In Table 1, the lamp lifetime is indicated by the illuminance maintenance rate after 750-hour lighting. On the assumption that the illuminance at initial lighting is 100% and the illuminance with which unusability is determined is less than 90%, A represents 95% or more to 100%, B represents 93% or more and less than 95%, C represents 91% or more and less than 93%, and D represents less than 91%.

It was confirmed that, as for sample nos. 16 to 18, the illuminance maintenance rate was lowered by getting affected by the oxygen release quantity being great or the crystal grain size being large. Specifically, the oxygen release quantity needs to exceed 1 ppm and be 20 ppm or less. Preferably, the oxygen release quantity is 4 ppm or more and 9 ppm or less. The content of the potassium needs to be 5 ppm or more and 30 ppm or less.

APPENDIX 1

A tungsten-containing material that has an oxygen generation quantity of more than 1 ppm and 20 ppm or less at 2100° C. to 2300° C. as detected by oxygen analysis based on an oxygen separation method, and contains 5 ppm or more and 30 ppm or less of potassium.

APPENDIX 2

The tungsten-containing material according to appendix 1, having a crystal grain size of 200 μm or less.

APPENDIX 3

The tungsten-containing material according to appendix 1 or 2, having a density of 19.1 g/cm$^3$ or more.

APPENDIX 4

The tungsten-containing material according to any one of appendices 1 to 3, wherein the tungsten-containing material is used in a discharge lamp electrode.

APPENDIX 5

A direct current discharge lamp electrode in which the tungsten-containing material according to appendix 4 is used.

It should be understood that the herein-disclosed embodiments and examples are presented by way of illustration in every respect and are not to be taken by way of limitation. The scope of the present invention is not defined by the description above but is defined by the claims, and is intended to include all changes within the purport and scope equivalent to the claims.

The invention claimed is:

1. A tungsten-containing material that has an oxygen generation quantity of more than 1 ppm and 20 ppm or less at 2100° C. to 2300° C. as detected by oxygen analysis based on an oxygen separation method, and contains 5 ppm or more and 30 ppm or less of potassium.

2. The tungsten-containing material according to claim 1, having a crystal grain size of 200 μm or less.

3. The tungsten-containing material according to claim 1, having a density of 19.1 $g/cm^3$ or more.

4. The tungsten-containing material according to claim 1, wherein the tungsten-containing material is used in a discharge lamp electrode.

5. A direct current discharge lamp electrode in which the tungsten-containing material according to claim 4 is used.

* * * * *